(12) United States Patent
Murphy et al.

(10) Patent No.: US 10,628,109 B2
(45) Date of Patent: Apr. 21, 2020

(54) DYNAMICALLY ADAPTING PANELS OF A USER INTERFACE

(71) Applicant: Google LLC, Mountain View, CA (US)

(72) Inventors: David Joseph Murphy, San Francisco, CA (US); Wing Hang Calvin Ku, Santa Clara, CA (US); Damon Seeley, Sunnyvale, CA (US); Lee B. Keely, San Francisco, CA (US); Alan Lee Gardner, III, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/673,082

(22) Filed: Aug. 9, 2017

(65) Prior Publication Data
US 2019/0050190 A1    Feb. 14, 2019

(51) Int. Cl.
| G06F 3/14 | (2006.01) |
| G06F 3/0481 | (2013.01) |
| G06F 8/38 | (2018.01) |
| G06F 3/0487 | (2013.01) |
| G06F 9/451 | (2018.01) |

(Continued)

(52) U.S. Cl.
CPC .......... *G06F 3/1446* (2013.01); *G06F 3/0202* (2013.01); *G06F 3/048* (2013.01); *G06F 3/0481* (2013.01); *G06F 3/0487* (2013.01); *G06F 8/38* (2013.01); *G06F 9/451* (2018.02); *G06F 2203/04803* (2013.01)

(58) Field of Classification Search
None
See application file for complete search history.

(56) References Cited

U.S. PATENT DOCUMENTS

| 5,838,317 | A | * | 11/1998 | Bolnick | ................ | G06F 3/0481 |
| | | | | | | 715/764 |
| 5,920,313 | A | * | 7/1999 | Diedrichsen | .......... | G06F 3/0481 |
| | | | | | | 715/767 |

(Continued)

OTHER PUBLICATIONS

PCT International Search Report and Written Opinion issued in International Application No. PCT/US2018/045167, dated Oct. 31, 2018, 14 pages.

*Primary Examiner* — Amare Mengistu
*Assistant Examiner* — Sarvesh J Nadkarni
(74) *Attorney, Agent, or Firm* — Fish & Richardson P.C.

(57) ABSTRACT

Methods, systems, and apparatus, including computer programs encoded on a computer storage medium, for providing contextual information for a notification. Logical relationships between panels for a user interface of the one or more computing devices are identified. A set of interface patterns that correspond to different logical relationships between panels and describe different spatial relationships for arranging panels having the corresponding logical relationships are obtained. At least one of the logical relationships between the panels for the user interface is determined to match a logical relationship corresponding to a particular interface pattern. The particular interface pattern is selected from among the set of interface patterns to specify the arrangement of the panels of the user interface. The user interface having the panels arranged in the user interface according to the particular interface pattern that is selected is provided.

18 Claims, 4 Drawing Sheets

(51) Int. Cl.
*G06F 3/02* (2006.01)
*G06F 3/048* (2013.01)

(56) References Cited

U.S. PATENT DOCUMENTS

| | | | | |
|---|---|---|---|---|
| 6,173,316 B1* | 1/2001 | De Boor | ............ | G06Q 30/0267 |
| | | | | 709/218 |
| 6,313,854 B1* | 11/2001 | Gibson | .................... | G09G 5/14 |
| | | | | 715/788 |
| 6,826,727 B1 | 11/2004 | Mohr et al. | | |
| 7,590,947 B1* | 9/2009 | Gay | ...................... | G06F 3/0483 |
| | | | | 715/798 |
| 7,752,572 B1* | 7/2010 | Shahrbabaki | ............. | G06F 8/38 |
| | | | | 715/810 |
| 7,770,109 B2* | 8/2010 | Fortes | ................... | G06F 17/211 |
| | | | | 715/209 |
| 7,873,622 B1* | 1/2011 | Karls | .................... | G06F 16/951 |
| | | | | 707/707 |
| 9,734,136 B1* | 8/2017 | Mody | ................. | G06F 17/2247 |
| 2003/0014445 A1* | 1/2003 | Formanek | ........... | G06F 16/9577 |
| | | | | 715/247 |
| 2004/0187079 A1* | 9/2004 | Yamada | ................ | G06F 17/211 |
| | | | | 715/246 |
| 2004/0225961 A1* | 11/2004 | Ohashi | .................. | G06F 17/212 |
| | | | | 715/247 |
| 2005/0076297 A1* | 4/2005 | Tanaka | ................... | G06Q 30/02 |
| | | | | 715/246 |
| 2005/0120288 A1* | 6/2005 | Boehme | ........... | G06F 16/954 |
| | | | | 715/246 |
| 2005/0193334 A1* | 9/2005 | Ohashi | .................. | G06F 17/248 |
| | | | | 715/246 |
| 2008/0168372 A1* | 7/2008 | Inui | ........................ | G06F 9/451 |
| | | | | 715/766 |
| 2011/0072394 A1 | 3/2011 | Victor | | |
| 2012/0078955 A1* | 3/2012 | Boguraev | .............. | G06Q 50/22 |
| | | | | 707/769 |
| 2013/0145314 A1* | 6/2013 | Dhar | ................. | A61B 6/4405 |
| | | | | 715/803 |
| 2014/0068451 A1* | 3/2014 | Ngo | ................. | H04M 1/72572 |
| | | | | 715/738 |

* cited by examiner

DYNAMICALLY ADAPTING PANELS OF A USER INTERFACE

FIELD

This specification describes technologies related to user interfaces.

BACKGROUND

Graphical user interfaces are displayed on devices to enable users to interact with the devices. For example, a graphical user interface may include a menu with options from which a user may make a selection.

SUMMARY

A graphical user interface may display information to a user in the form of one or more panels. For example, graphical user interface may include a single panel, two panels side by side, one panel on top of a second panel, or some other arrangement of panels. A panel may be a graphical arrangement of information grouped together for presentation to a user. For example, a panel may be a window for a web of browser, a window of an e-mail application, a contextual menu, an image, or some other graphical arrangement of information.

Panels may be displayed in a predetermined manner specified by applications. For example, an e-mail application may specify that the e-mail application be shown in a first panel, and when a user clicks on a particular contextual menu, the particular contextual menu should be displayed in a second panel that overlays part of the first panel. However, displaying panels in a predetermined manner specified by applications may result in graphical user interfaces that are difficult to use in certain circumstances. For example, a device may be displaying a third panel side by side with the first panel so that when the second panel is shown overlaying the first panel, the second panel may be too small for a user to easily interact with.

To overcome these problems, a system may generate a graphical user interface that includes one or more panels arranged according to a spatial relationship described by a particular interface pattern. The interface pattern may be selected from among multiple interface patterns based on respective logical relationships described by the interface patterns and at least one logical relationship of one or more panels to be displayed. A logical relationship between panels may indicate one or more of dependence, hierarchy, or similarity among panels. A logical relationship may be a semantic relationship where content in one panel may be relevant to a meaning of content in another panel. A spatial relationship between panels may indicate one or more of a size, shape, or location of panels relative to one another.

For example, a system may determine that three panels for display have a particular logical relationship between one another that matches a logical relationship described by a first pattern, where the first pattern also describes a spatial relationship where panels are to be displayed with a first panel taking a left side of a screen, and a second panel and third panel evenly sharing the right side of the screen. In another example, a system may determine that three panels have a particular logical relationship between one another that matches a logical relationship described by a second pattern, where the second pattern also describes a spatial relationship where panels are to be displayed with all three panels shown side by side. In yet another example, a system may determine that three panels have a particular logical relationship between one another that matches a logical relationship described by a third pattern, where the third pattern also describes a spatial relationship where panels are to be displayed with a first panel and tabs shown for switching to the second panel and third panel from the first panel.

Accordingly, the system may enable an operating system to dynamically re-arrange panels of the same or different applications as panels open and close. The interface patterns may enable the re-arrangement of panels to be based on logical relationships between panels instead of hard-coded instructions that specify a particular panel must always be shown in a particular manner. Accordingly, the system may re-arrange panels to make it easier for users to interact with the panels as a set of panels that might be displayed changes.

One innovative aspect of the subject matter described in this specification is embodied in methods that include the actions of identifying, by the one or more computing devices, logical relationships between panels for a user interface of the one or more computing devices, obtaining, by the one or more computing devices, a set of interface patterns that correspond to different logical relationships between panels and describe different spatial relationships for arranging panels having the corresponding logical relationships, determining, by the one or more computing devices, that at least one of the logical relationships between the panels for the user interface matches a logical relationship corresponding to a particular interface pattern, in response to determining that at least one of the logical relationships between panels for the user interface matches the logical relationship corresponding to the particular interface pattern, selecting, by the one or more computing devices, the particular interface pattern from among the set of interface patterns to specify the arrangement of the panels of the user interface, and providing, by the one or more computing devices, the user interface having the panels arranged in the user interface according to the particular interface pattern that is selected.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects, the logical relationship corresponding to the particular interface pattern may include a relationship indicating that a first panel was created from a second panel. In some aspects, the panels for the user interface may include a contextual menu of an application, different windows of an application, or different windows of different applications.

In some implementations, determining that at least one of the logical relationships between the panels for the user interface matches a logical relationship corresponding to a particular interface pattern may include determining a first relationship similarity score for the particular interface pattern based on a logical relationship corresponding to the particular interface pattern and the logical relationships between the panels for the user interface, determining a second relationship similarity score for a second interface pattern based on a logical relationship corresponding to the second interface pattern and the logical relationships between the panels for the user interface, and determining that the first relationship similarity score indicates a level of similarity between the logical relationship corresponding to the particular interface pattern and the logical relationships between panels for the user interface that is higher than a level of similarity that the second relationship similarity score indicates between the logical relationship corresponding to the second interface pattern and the logical relationships between the panels for the user interface, and where determining that at least one of the logical relationships between the panels for the user interface matches the logical relationship corresponding to the particular interface pattern is based on determining that the first relationship similarity score indicates a level of similarity that is higher than the level of similarity indicated by the second similarity score.

In certain aspects, identifying logical relationships between the panels for the user interface may include one or more of identifying that a first panel is a child of a second panel, identifying that a first panel is a sibling of a second panel, identifying that a first panel is dependent on a second panel, identifying that a first panel is embedded within a second panel, identifying that a first panel is serial to a second panel, or identifying that a first panel controls a second panel. In some aspects, identifying logical relationships between panels for the user interface may include generating a graph of nodes, where each node represents a panel and edges between the nodes represent the logical relationships between the panels. In some implementations, each edge in the graph of nodes may represent a type of logical relationship that exists between the panels represented by the nodes connected by the edge. In certain aspects, the particular interface pattern may describe a second graph of nodes, where each node represents a panel and edges between the nodes represent the logical relationships between the panels, where a particular edge of the second graph of nodes represents the at least one logical relationship described by the particular interface pattern, determining that the logical relationships between panels of the set of panels that are identified matches the at least one logical relationship between panels described by a particular interface pattern includes determining that the graph of nodes includes an edge that represents a logical relationship type that matches a logical relationship type represented by the particular edge of the second graph of nodes.

In some aspects, actions may include identifying an additional panel for the user interface and in response to identifying the additional panel for the user interface, adding an additional node corresponding to the additional panel to the graph of nodes and at least one additional edge from the additional node to another node of the graph of nodes, where the additional edge represents a logical relationship between the additional node and the other node of the graph of nodes. In some implementations, actions may include generating a list of panels that had focus where when a panel gains focus it is added to a head of the list and a dismissal of the panel results in a removal of the panel from the list, where selecting the particular interface pattern from among the set of interface patterns to specify the arrangement of the panels of the user interface is also based at least on the list of panels that had focus.

In certain aspects, identifying logical relationships between panels for the user interface may include determining which panel of the panels for the user interface currently has focus on the user interface, where the logical relationship that corresponds to the particular interface pattern describes a particular panel has focus, and determining that a logical relationship between panels for the user interface matches the logical relationship corresponding to the particular interface pattern comprises determining that the panel that currently has focus on the user interface matches the panel described by the particular interface pattern as having focus.

In some implementations, providing the user interface having the panels arranged in the user interface according to the particular interface pattern that is selected may include identifying location and sizes for panels described by the particular interface pattern and mapping the panels in the set of panels to the location and sizes for panels described by the particular interface pattern.

In some aspects, actions may include determining a characteristic of a device that the interface is to be displayed on, where obtaining the set of interface patterns includes obtaining an initial set of interface patterns that each describe device requirements, determining whether the characteristic of the device satisfies the device requirements described by each of the interface patterns of the initial set of interface patterns, and generating the set of interface patterns to only include the interface patterns in the initial set of interface patterns that describe device requirements satisfied by the characteristic of the device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
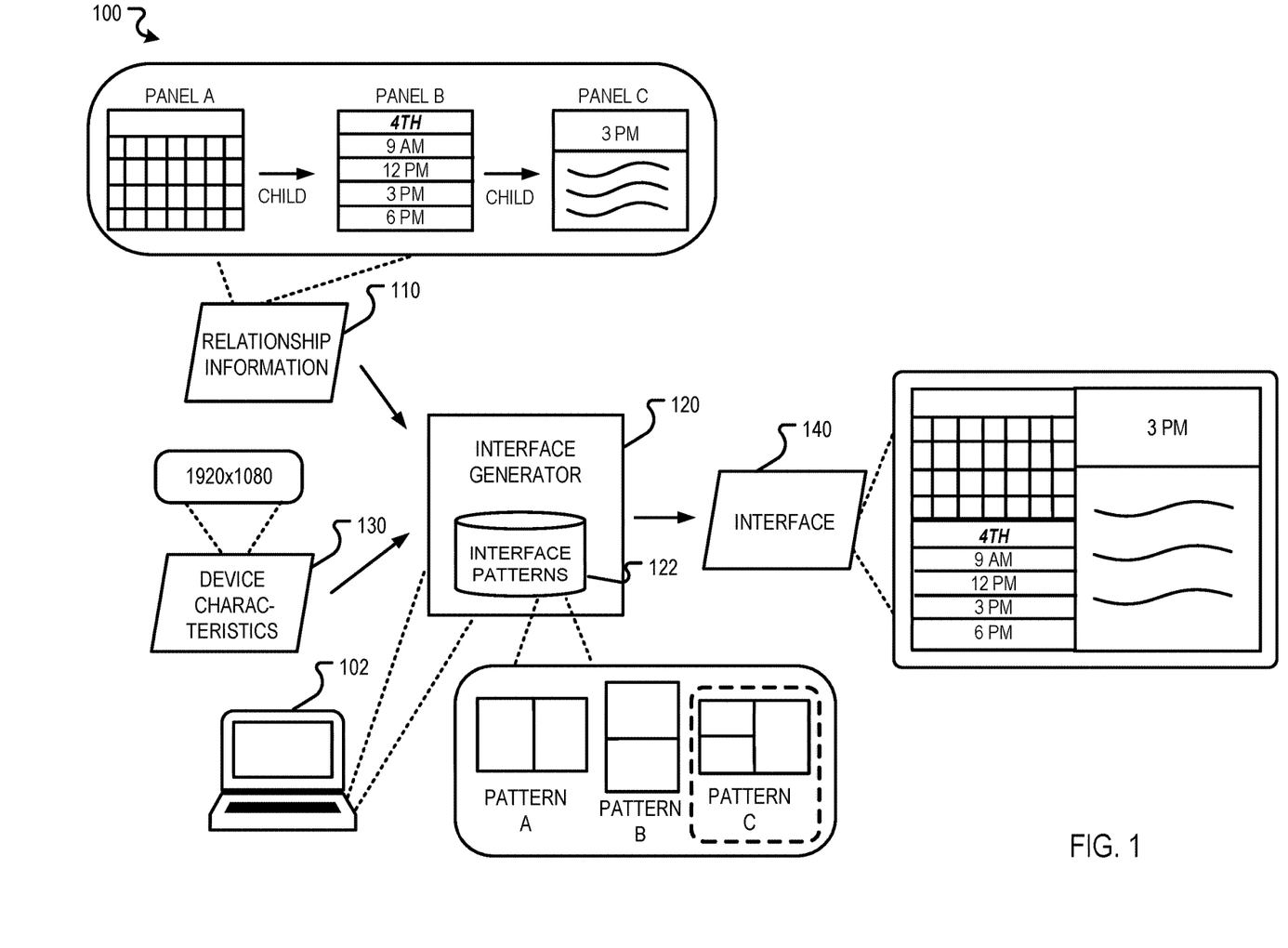
FIG. 1 is a block diagram of an example environment in which an interface is generated.

FIG. 1 is a block diagram of an example environment 100 in which an interface is generated. The environment 100 includes a user device 102 on which the interface 140 may be generated and displayed. The user device 102 is an electronic device that displays the interface 140 through which a user can interact with the user device 102. Example user devices 102 include personal computers (e.g., desktops or laptops), mobile communication devices (e.g., smart phones or tablets), and other devices.

The user device 102 may include relationship information 110 that describes logical relationships between panels for display, device characteristics 130 that describe characteristics of the user device 102, and an interface generator 120 that obtains the relationship information 110 and device characteristics 130 to generate the interface 140. The relationship information 110 may describe logical relationships between panels for display on the user device 102. The logical relationships may be one or more of dependence, hierarchy, or similarity among panels. For example, a logical relationship between two panels may be a parent and child relationship where a first panel is a parent and the second panel is a child that is shown in response to a user interacting with the first panel. In another example, a logical relationship between two panels may be a co-planar where a first panel and second panel are shown in response to interactions that are not dependent on the other panel. In yet another example, a logical relationship between two panels may be a dependent relationship where a second panel is only displayed when the first panel is displayed. In still another example, a logical relationship between two panels may be an arbitrary relationship where a first panel and second panel do not have any dependencies between one another in how they are to be displayed. In another example, a logical relationship between two panels may be an embedded logical relationship where a first panel is embedded within a second panel. In yet another example, a logical relationship between two panels may be a remote control relationship where a first panel controls a second panel.

As shown in FIG. 1, the relationship information describes "Panel C" is a child of "Panel B," and "Panel B" is a child of "Panel A." "Panel A" is shown as a calendar interface where a user may select a day, "Panel B" is shown as a time interface where a user may select a time slot for the selected day, and "Panel C" is shown as an event interface where a user may enter details for the selected time slot of the selected day. In some implementations the relationship information 110 may describe how the panels are related without describing the content within the panels. For example, the relationship information may simply describe that there is a parent panel, a child panel, and a nested child panel without describing that the parent panel is a calendar interface, the child panel is a time interface, and the nested child panel is an event interface.

The device characteristics 130 may describe one or more characteristics of the user device 102. For example as shown in FIG. 1, the device characteristics describe that the user device 102 has a display that has a resolution of 1920×1080 pixels. Characteristics may include one or more of resolution, physical screen dimensions, touch capability, and other characteristics.

The interface generator 120 obtains the relationship information 110 and device characteristics 130 to generate the interface 140. For example, the interface generator 120 may obtain the relationship information 110 that describes "Panel C" is a child of "Panel B," and "Panel B" is a child of "Panel A" and the device characteristics that describe the user device 130 has a resolution of 1920×1080. In response, the interface generator 120 may generate an interface that includes "Panel A" above "Panel B" with both evenly sharing a left half of an interface and "Panel C" taking a right half of an interface.

The interface generator 120 may obtain the relationship information 110 by monitoring an order that panels are generated and a source that panels are generated from. For example, the interface generator 120 may monitor that "Panel B" was created from a user interacting with "Panel A" and, in response, determine that "Panel A" and "Panel B" have a parent-child relationship. In another example, the interface generator 120 may obtain the relationship information 110 by examining metadata of the panels. For example, when "Panel B" is created from "Panel A," "Panel B" may be stored with metadata that indicates that "Panel B" was generated from "Panel A." In yet another example, the interface generator 120 may obtain the relationship information 110 by examining behavior of the panels. For example, the interface generator 120 may determine that instructions of an application indicate that if "Panel A" is closed then "Panel B" should also close and, in response, determine a relationship that "Panel B" is dependent on "Panel A."

The interface generator 120 may include a data store 122 that stores multiple interface patterns and generate the interface 140 using the multiple stored interface patterns. For example, the data store 122 may store a first pattern "Pattern A," a second pattern "Pattern B," and a third pattern "Pattern C," and generate the interface 140 using the patterns.

Each interface pattern of the multiple interface patterns may describe respective logical relationships between panels and a spatial relationship that describes how panels matching the logical relationship are to be displayed. For example, the first interface pattern "Pattern A" may describe that two panels with a parent-child relationship on a screen that has a landscape format be displayed with the parent panel on a left half and the child panel on a right half. A second interface pattern "Pattern B" may describe that two panels with a parent-child relationship on a screen that has a portrait format be displayed with the child panel taking half a screen above the parent panel taking the other half of the screen. A third interface pattern "Pattern C" may describe that three panels with a parent-child-nested child relationship on a screen that has a landscape format be displayed with the parent panel on a left top quadrant, the child panel on a left bottom quadrant, and a nested child panel on the right half.

In some implementations, the interface patterns may additionally or alternatively describe aspects that are behavioral. For example, an interface pattern may describe that scroll positions between particular panels of the interface pattern should be synchronized or that a particular animation should be shown in response to a particular user interaction when the interface pattern is used.

The interface generator 120 may determine that at least one of the logical relationships between the panels for the user interface matches a logical relationship corresponding to a particular interface pattern. For example, the interface generator 120 may determine that the identified relationship information 110 of "Panel C" is a child of "Panel B," and "Panel B" is a child of "Panel A" matches logical relationships of parent-child-nested child described for "Pattern C." Accordingly, the interface generator 120 may determine different interface patterns that better suit different devices with difference device characteristics and different relationships between panels for display.

The interface generator 120 may select the particular interface pattern in response to determining that at least one of the logical relationships between the panels for the user interface matches a logical relationship corresponding to a particular interface pattern. For example, in response to the interface generator 120 determining that "Panel C" describes logical relationships that match the identified logical relationships of relationships of parent-child-nested child, the interface generator 120 may select "Panel C" from amongst all the interface patterns in the data store 122.

The interface generator 120 may provide a user interface having the panels arranged according to the interface pattern that is selected. For example, the selected interface pattern may describe that three panels with a parent-child-nested child relationship be displayed on a screen that has a landscape format with the parent panel on a left top quadrant, the child panel on a left bottom quadrant, and a nested child panel on the right half. In response, the interface generator 120 may arrange "Panel A" that corresponds to the parent panel in a left upper quadrant, "Panel B" that corresponds to the child panel in a left lower quadrant, and "Panel C" that corresponds to the nested child in a right half.

The interface generator 120 may arrange the set of panels according to the interface pattern that is selected by identifying locations and sizes for panels in the spatial relationship described by the interface pattern and mapping the panels to locations and sizes for panels described by the interface pattern. For example, the interface generator 120 may identify that "Pattern C" includes a first panel located and sized to take up an upper left quadrant, a second panel located and sized to take up an lower left quadrant, and a third panel located and sized to take up a right half. In the example, the interface generator 120 may then map the corresponding panels in the set of panels for display to the locations and sizes for panels described by the interface pattern.

In some implementations, the interface patterns may additionally describe which panels have focus in the interface 140. For example, an interface pattern may describe that a parent child relationship on a small screen be displayed where the child panel is overlaid on a parent panel and the child panel is in focus. In another example, an interface pattern may describe that a dependent relationship be displayed where the dependent panel is shown side by side with the other panel with both panels in focus. Focus may refer to whether user input will be directed into a panel. For example, clicking on a graphical control element of a panel in focus will activate the graphical control element and clicking on a graphical element of a panel that's not in focus will put the panel in focus without activating the graphical control element.

In some implementations, the interface patterns may describe requirements. For example, an interface pattern may describe that two sibling panels be shown side by side but that each panel most have at least a resolution of 600×600. Accordingly, if the interface generator 120 determines that the requirement is not satisfied by obtained device characteristics, the interface generator 120 may determine not to select the interface pattern. In some implementations, when the interface generator 120 obtains the interface patterns, the interface generator 120 may filter the interface patterns to remove or only obtain the interface patterns with requirements that are satisfied by the obtained device requirements.

While FIG. 1 shows the interface generator 120 on the user device 102, in some implementations the interface generator 120 may instead be on a server where the server obtains relationship information 110 that describes relationships between panels for display, obtains device characteristics 130 that describe characteristics of the user device 102, generates the interface 140 using the relationship information 110 and the device characteristics 130, and provides the interface 140 to the user device 102. In some other implementations, the interface generator 120 may be implemented on both the user device 102 and a server. For example, the user device 102 may obtain relationship information 110 and device characteristics 130, provide the relationship information 110 and device characteristics 130 to the server, the server may select an interface pattern from among multiple interface patterns based on the relationship information 110 and device characteristics 130, the server may provide the selected interface pattern to the user device 102, and the user device 102 may generate the interface by arranging the set of panels according to the selected interface pattern.

In some implementations, the interface generator 120 may also select an interface pattern based on intrinsic properties of panels. For example, the interface pattern 120 may determine that a panel indicates that if the panel is displayed the panel must be displayed at least at a particular minimum resolution and the interface generator 120 may use that intrinsic property in selecting an interface pattern. In another example, a panel may indicate that the panel must not be shown being overlapped by another panel and use that property in selecting an interface pattern.

Figure 2:
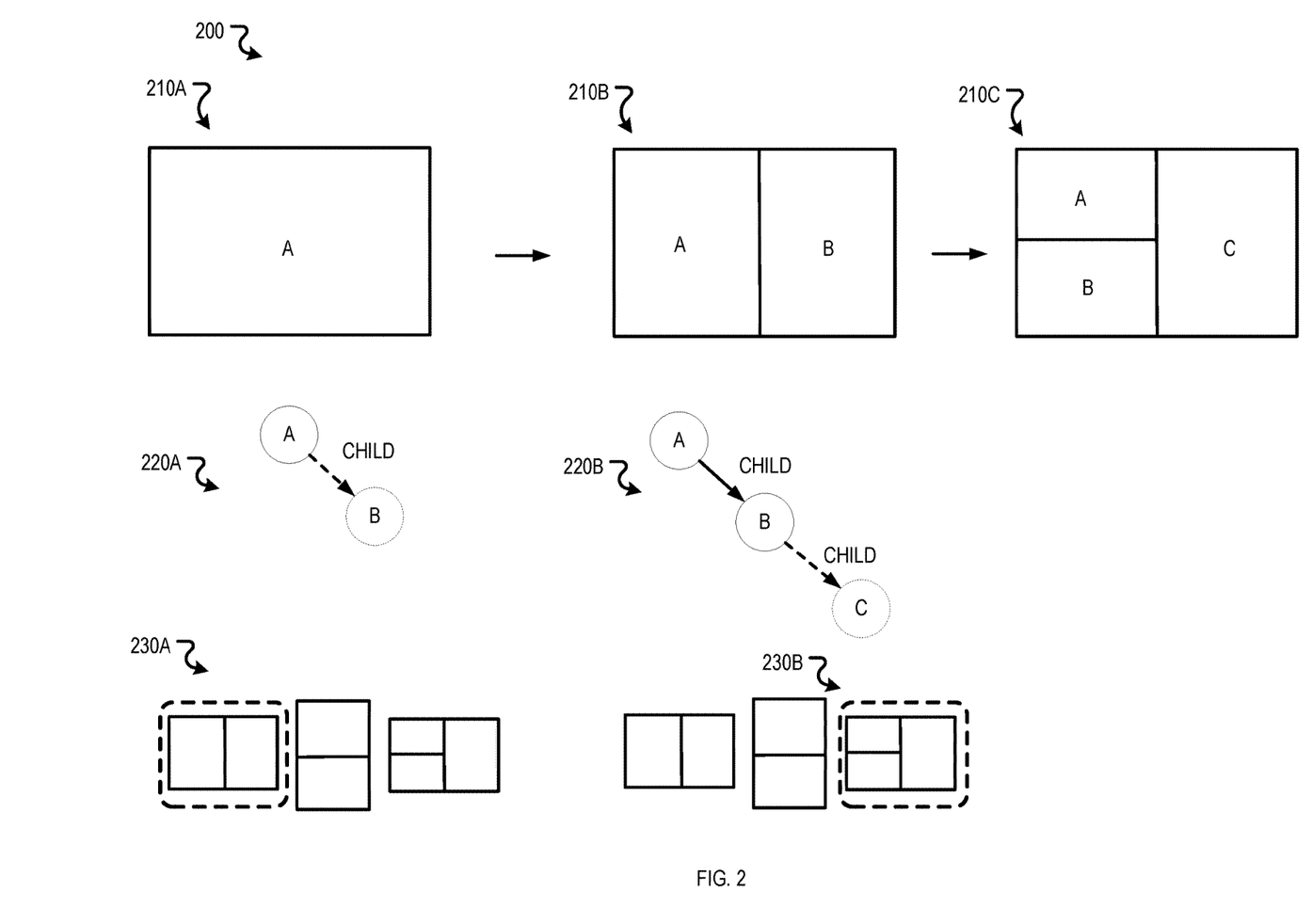
FIG. 2 is a block diagram of an example representation of data for generating an interface.

FIG. 2 is a block diagram of an example representation 200 of data for generating an interface. The representation 200 shows how interfaces 210A, 210B, and 210C, node graphs 220A and 220B, and interface patterns 230A and 230B are used in generating interfaces when first displaying a first panel, then displaying the first panel as a parent panel and displaying a child panel, and then displaying the parent panel, the child panel, and a nested child panel.

The representation 200 shows a first interface 210 A with a first panel, "Panel A," where a child panel "Panel B" is to be additionally displayed. For example, the "Panel A" may be a calendar interface, a user may have just selected a day, and the system may be additionally displaying a child panel "Panel B" with a time interface to select a time slot.

When a system determines to display a child panel, the node graph 220A may be updated. For example, the node graph 220A shows a first node labeled "A" representing "Panel A" and, in dotted outline, a second node labeled "B" representing "Panel B" and edge from the first node to second node labeled child. The node graph 220A may represent relationship information that describes logical relationships between panels for display. In some implementations, relationship information 110 of FIG. 1 may be represented by a node graph.

The representation 200 shows that the node graph 220A is determined to match the interface pattern 230A, which is also shown outlined in FIG. 2. Interface 210B is then generated using a spatial relationship described by the interface pattern 230A. For example, the interface generator 120 may generate the interface 210B using the spatial relationship described by the interface pattern 230A.

The representation 200 shows interface 210 B with a parent panel "Panel A," a child panel "Panel B," and a nested panel "Panel C" to be displayed. For example, the "Panel A" may be a calendar interface, "Panel B" may be a time interface, and a user may have just selected a time slot and the system may be showing a nested child panel "Panel C" with an event interface where a user may enter details for the selected time slot of the selected day.

When a system determines to display a nested child panel, the node graph 220B may be updated. For example, the node graph 220B shows a first node labeled "A" representing "Panel A" with an edge labeled child to a second node labeled "B" representing "Panel B" and, in dotted outline, a third node labeled "C" representing "Panel C" and edge from the second node to third node labeled child.

The representation 200 shows that the node graph 220B is determined to match the interface pattern 230B, which is also shown outlined in FIG. 2. Interface 210C is then generated using the spatial relationship described by the interface pattern 230B. For example, the interface generator 120 may generate the interface 210C using the spatial relationship described by the interface pattern 230B.

As shown in FIG. 2, new nodes may be added to a node graph along with corresponding edges as new panels come into existence for a user interface. Similarly, existing nodes and corresponding edges may be removed from a node graph when panels are dismissed or no longer needed for the user interface. For example, when a panel corresponding to the third node labeled "C" is dismissed the dotted line edge and node shown in the node graph 220B may be removed.

In some implementations, a list of panels that had focus may be generated and stored separately from the node graph. The list of panels may represent panels that had focus where when a panel gains focus it is added as a head of the list and a dismissal of a panel results in a removal of the panel from the list. The list may be used a signal for ordering panels. For example, the list be used in selecting an interface pattern or used in determining which panels to show once an interface pattern is selected.

Figure 3:
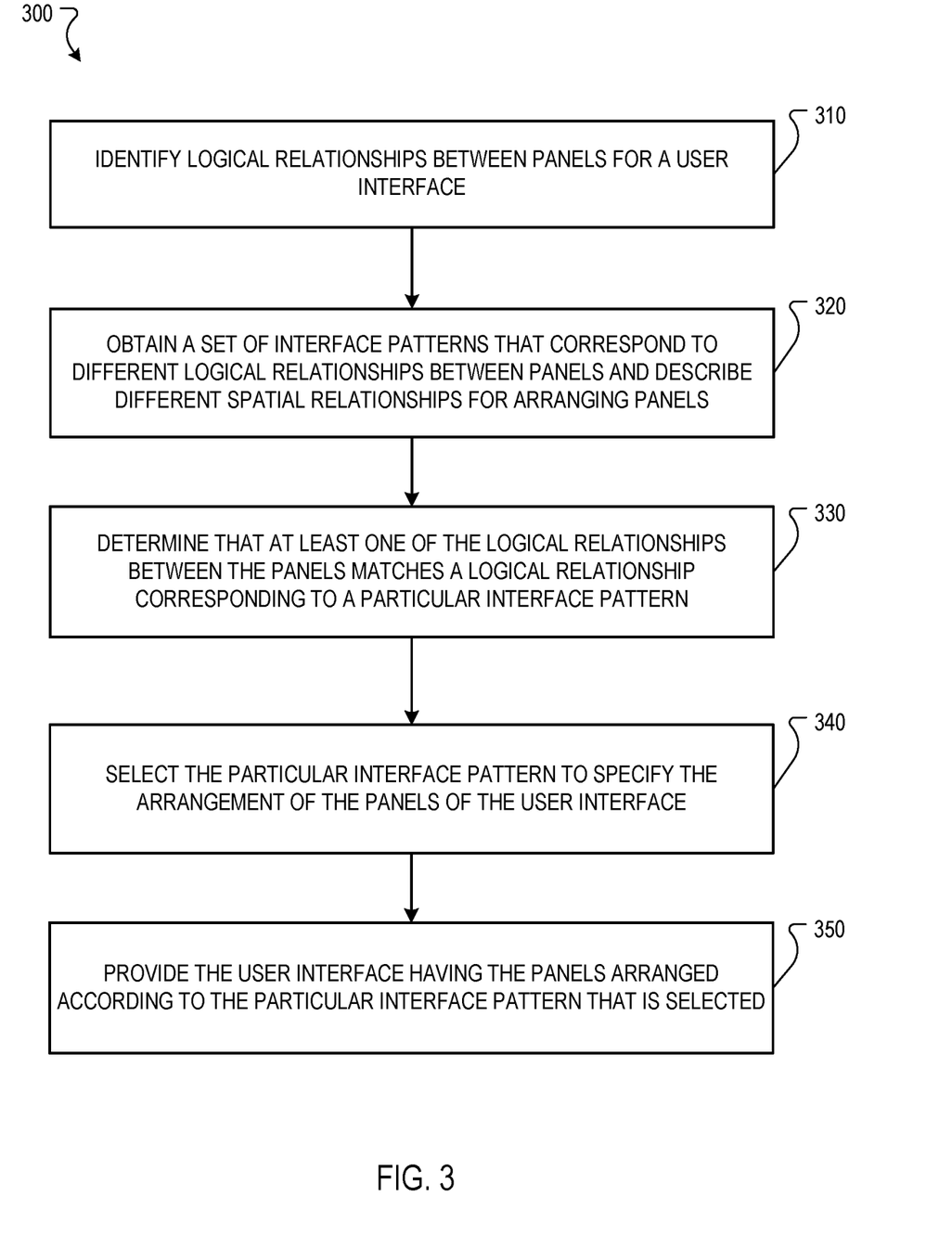
FIG. 3 is a flow diagram that illustrates an example of a process providing data for an interface.

FIG. 3 is a flow diagram that illustrates an example of a process 300 providing data for an interface. The operations of the process 300 may be performed by one or more computing systems, such as the user device 102 of FIG. 1.

Logical relationships between panels for a user interface may be identified (310). For example, the interface generator 120 may obtain relationship information that describes three panels are to be displayed and the three panels are in a co-planar relationship with equal importance. In some implementations, identifying logical relationships between panels includes identifying that one or more of a first panel is a child of a second panel, that a first panel is a sibling of a second panel, that a first panel is dependent on a second panel, that a first panel is embedded within a second panel, that a first panel is serial to a second panel, that a first panel controls a second panel, or that a first panel was created from a second panel.

In some implementations, identifying logical relationships between panels includes generating a graph of nodes, where each node represents a panel and edges between the nodes represent the logical relationships between the panels. For example, the interface generator 120 may generate the node graphs 220A and 220B. Each edge in the graph of nodes may represent a type of logical relationship that exists between the panels represented by the nodes connected by the edge. In some implementations, identifying logical relationships between panels includes determining which panel of the set of panels has focus. For example, the interface generator 120 may determine that the relationship information describes that a first panel of co-planar panels has focus, and determine to initially show the first panel in focus with tabs to replace the first panel with a respective other panel.

In some implementations, the graph of nodes may be generated as the interface generator 120 monitors the opening and closing of panels. For example, the interface generator 120 may monitor each time a new panel is to be displayed and, in response update the graph of nodes. In another example, the interface generator 120 may monitor each time a panel is closed and, in response update the graph of nodes.

A set of interface patterns that correspond to different logical relationships between panels and describe different spatial relationships for arranging panels is obtained (320). For example, the interface generator 120 may access all the interface patterns stored in the data store 122.

At least one of the logical relationships between the panels for the user interface is determined to match a logical relationship corresponding to a particular interface pattern (330). For example, the interface generator 120 may determine that co-planar relationship between three panels described by relationship information matches a co-planar relationship between three panels described by the first pattern and, in response, select the first interface pattern.

In some implementations, determining that at least one of the logical relationships between the panels for the user interface matches a logical relationship corresponding to a particular interface pattern includes determining a first relationship similarity score for the particular interface pattern based on a logical relationship corresponding to the particular interface pattern and the logical relationships between the panels for the user interface, determining a second relationship similarity score for a second interface pattern based on a logical relationship corresponding to the second interface pattern and the logical relationships between the panels for the user interface, and determining that the first relationship similarity score indicates a level of similarity between the logical relationship corresponding to the particular interface pattern and the logical relationships between panels for the user interface that is higher than a level of similarity that the second relationship similarity score indicates between the logical relationship corresponding to the second interface pattern and the logical relationships between the panels for the user interface, where determining that at least one of the logical relationships between the panels for the user interface matches the logical relationship corresponding to the particular interface pattern is based on determining that the first relationship similarity score indicates a level of similarity that is higher than the level of similarity indicated by the second similarity score. For example, the interface generator 120 may determine a similarity score of 95% for a first interface pattern and a similarity score of 50% for a second interface pattern, determine that the similarity score of 95% for the first interface pattern indicates more similarity than the similarity score of 50% for the second interface pattern and, in response, determine that the first interface pattern matches at least one of the logical relationship of the panels for the user interface.

In some implementations, a particular interface pattern describes a second graph of nodes, where each node represents a panel and edges between the nodes represent the logical relationships between the panels, where a particular edge of the second graph of nodes represents the at least one logical relationship described by the particular interface pattern, determining that the logical relationships between panels of the set of panels that are identified matches the at least one logical relationship between panels described by a particular interface pattern includes determining that the graph of nodes includes an edge that represents a logical relationship type that matches a logical relationship type represented by the particular edge of the second graph of nodes.

An interface pattern may be selected from among a set of interface patterns based at least on the relationships between the panels of the set of panels (340). For example, based on obtained relationship information that describes three panels for display are co-planar, the interface generator 120 may select a first pattern that describes that three panels in a co-planar relationship are to be displayed with the most recently opened panel in focus with tabs for replacing the most recently opened panel with a respective other panel.

In some implementations, identifying logical relationships between panels for the user interface includes determining which panel of the panels for the user interface currently has focus on the user interface, where the logical relationship that corresponds to the particular interface pattern describes represents an arrangement of panels in which a particular panel has focus, and where determining that a logical relationship between panels for the user interface matches the logical relationship corresponding to the particular interface pattern comprises determining that the panel that currently has focus on the user interface matches the panel described by the particular interface pattern as having focus.

The user interface having the panels arranged according to the particular interface pattern that is selected may be provided (350). For example, the interface generator 120 may generate an interface where the most recently opened panel is shown first with tabs for replacing the most recently opened panel with a respective other panel. In some implementations, providing the user interface having the panels arranged in the user interface according to the particular interface pattern that is selected includes identifying location and sizes for panels described by the interface pattern and mapping the panels in the set of panels to the location and sizes for panels described by the interface pattern. For example, the first pattern may describe that for three co-planar panels, the most recently opened panel takes up the entire interface and tabs be included for replacing the mostly opened panel with a respective other panel.

In some implementations, the process includes 300 determining a characteristic of a device that the interface is to be displayed on, where obtaining the set of interface patterns includes obtaining an initial set of interface patterns that each describe device requirements, determining whether the characteristic of the device satisfies the device requirements described by each of the interface patterns of the initial set of interface patterns, and generating the set of interface patterns to only include the interface patterns in the initial set of interface patterns that describe device requirements satisfied by the characteristic of the device. For example, the interface generator 120 may determine a resolution of a screen is 1920×1080, obtain a set of interface patterns that describe various resolution requirements, determine whether the resolution of 1920×1080 satisfies the resolution requirements described by the set of interface patterns, and generate a set of interface patterns that only include interface patterns with resolution requirements satisfied by a resolution of 1920×1080.

In some implementations, the process 300 may be performed in response to detecting a change in the relationships between panels of the set of panels. For example, the interface generator 120 may detect that a new panel is also to be displayed or a graph of nodes has changed and, in response, perform process 300 to generate a new interface. In another example, the interface generator 120 may detect that panel should no longer be displayed and, in response, perform process 300 to generate a new interface. In yet another example, the interface generator 120 may detect that a focus has changed to another panel in the set of panels and, in response, perform process 300 to generate a new interface.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Figure 4:
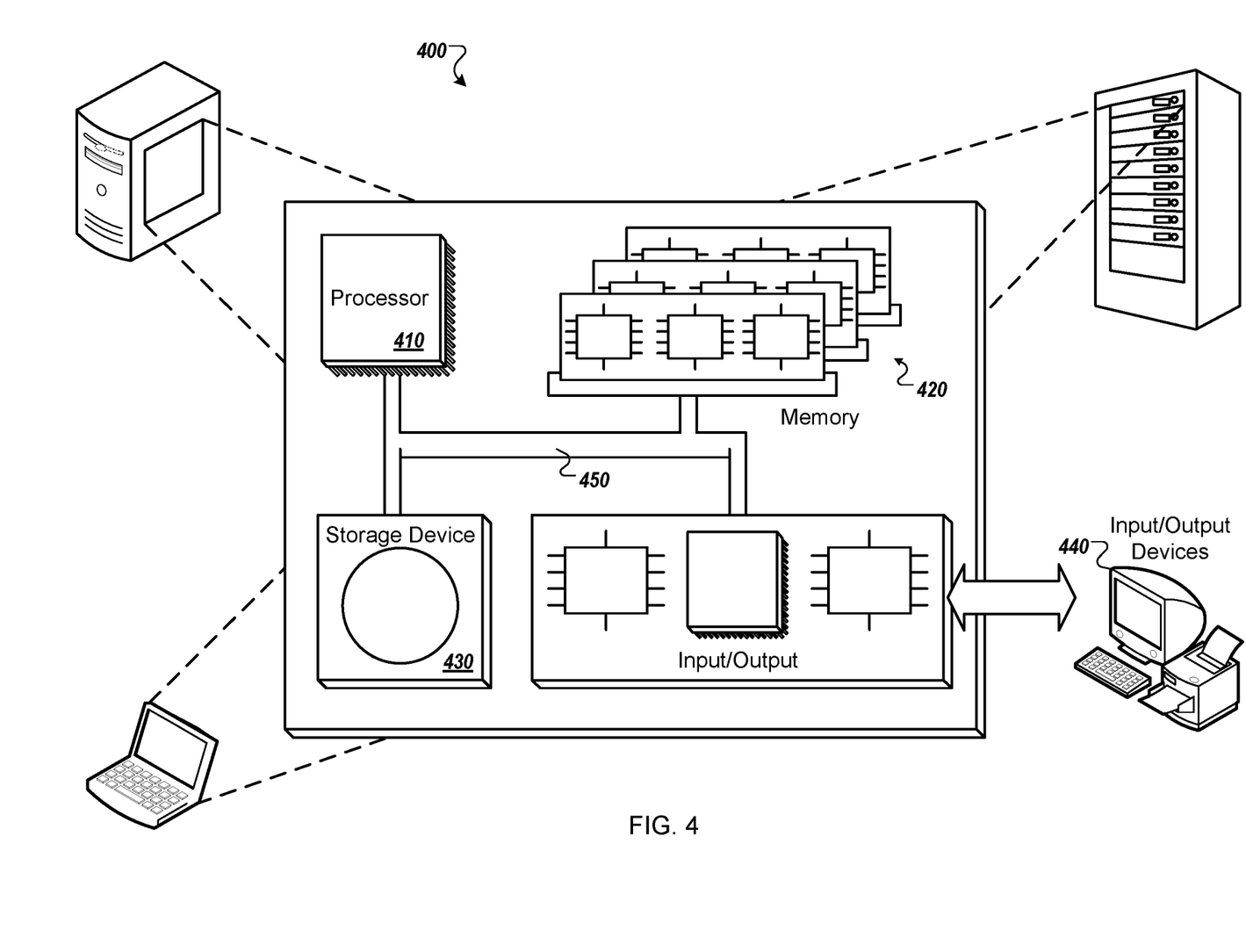
FIG. 4 is a schematic diagram of a computer system.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    identifying, by the one or more computing devices, logical relationships between the panels for a user interface of the one or more computing devices;
    obtaining, by the one or more computing devices, a set of interface patterns that correspond to different logical relationships between panels and describe different spatial relationships for arranging panels having the corresponding logical relationships;
    determining, by the one or more computing devices, that at least one of the logical relationships between the panels for the user interface matches a logical relationship corresponding to a particular interface pattern;
    in response to determining that at least one of the logical relationships between panels for the user interface matches the logical relationship corresponding to the particular interface pattern, selecting, by the one or more computing devices, the particular interface pattern from among the set of interface patterns to specify the arrangement of the panels of the user interface; and
    providing, by the one or more computing devices, the user interface having the panels arranged in the user interface according to the particular interface pattern that is selected,
    wherein determining that at least one of the logical relationships between the panels for the user interface matches a logical relationship corresponding to a particular interface pattern comprises:
        determining a first relationship similarity score for the particular interface pattern based on a logical relationship corresponding to the particular interface pattern and the logical relationships between the panels for the user interface;
        determining a second relationship similarity score for a second interface pattern based on a logical relationship corresponding to the second interface pattern and the logical relationships between the panels for the user interface; and
        determining that the first relationship similarity score indicates a level of similarity between the logical relationship corresponding to the particular interface pattern and the logical relationships between panels for the user interface that is higher than a level of similarity that the second relationship similarity score indicates between the logical relationship corresponding to the second interface pattern and the logical relationships between the panels for the user interface; and
        wherein determining that at least one of the logical relationships between the panels for the user interface matches the logical relationship corresponding to the particular interface pattern is based on determining that the first relationship similarity score indicates a level of similarity that is higher than the level of similarity indicated by the second similarity score.

2. The method of claim 1, wherein the logical relationship corresponding to the particular interface pattern comprises a relationship indicating that a first panel was created from a second panel, the method further comprising dynamically rearranging the panels in response to a closing or an opening of another panel.

3. The method of claim 1, wherein the panels for the user interface comprise:
    a contextual menu of an application;
    different windows of an application; or
    different windows of different applications.

4. The method of claim 1, wherein identifying logical relationships between the panels for the user interface comprises one or more of:
    identifying that a first panel is a child of a second panel;
    identifying that a first panel is a sibling of a second panel;
    identifying that a first panel is dependent on a second panel;
    identifying that a first panel is embedded within a second panel;
    identifying that a first panel is serial to a second panel; or
    identifying that a first panel controls a second panel.

5. The method of claim 1, wherein identifying logical relationships between panels for the user interface comprises:
    generating a graph of nodes, where each node represents a panel and edges between the nodes represent the logical relationships between the panels.

6. The method of claim 5, wherein each edge in the graph of nodes represents a type of logical relationship that exists between the panels represented by the nodes connected by the edge.

7. The method of claim 6, wherein the particular interface pattern describes a second graph of nodes, where each node represents a panel and edges between the nodes represent the logical relationships between the panels, where a particular edge of the second graph of nodes represents the at least one logical relationship described by the particular interface pattern,
    wherein determining that the logical relationships between panels of the set of panels that are identified matches the at least one logical relationship between panels described by a particular interface pattern comprises:
        determining that the graph of nodes includes an edge that represents a logical relationship type that matches a logical relationship type represented by the particular edge of the second graph of nodes.

8. The method of claim 5, comprising:
    identifying an additional panel for the user interface; and
    in response to identifying the additional panel for the user interface, adding an additional node corresponding to the additional panel to the graph of nodes and at least one additional edge from the additional node to another node of the graph of nodes, where the additional edge represents a logical relationship between the additional node and the other node of the graph of nodes.

9. The method of claim 5, comprising:
    generating a list of panels that had focus where when a panel gains focus it is added to a head of the list and a dismissal of the panel results in a removal of the panel from the list,
    wherein selecting the particular interface pattern from among the set of interface patterns to specify the arrangement of the panels of the user interface is also based at least on the list of panels that had focus.

10. The method of claim 1, wherein identifying logical relationships between panels for the user interface comprises:
    determining which panel of the panels for the user interface currently has focus on the user interface,
    wherein the logical relationship that corresponds to the particular interface pattern describes a particular panel has focus, and
    wherein determining that a logical relationship between panels for the user interface matches the logical relationship corresponding to the particular interface pattern comprises determining that the panel that currently has focus on the user interface matches the panel described by the particular interface pattern as having focus.

11. The method of claim 1, wherein providing the user interface having the panels arranged in the user interface according to the particular interface pattern that is selected comprises:
identifying location and sizes for panels described by the particular interface pattern; and
mapping the panels in the set of panels to the location and sizes for panels described by the particular interface pattern.

12. The method of claim 1, comprising:
determining a characteristic of a device that the interface is to be displayed on,
wherein obtaining the set of interface patterns comprises:
obtaining an initial set of interface patterns that each describe device requirements;
determining whether the characteristic of the device satisfies the device requirements described by each of the interface patterns of the initial set of interface patterns; and
generating the set of interface patterns to only include the interface patterns in the initial set of interface patterns that describe device requirements satisfied by the characteristic of the device.

13. A system comprising:
a data processing apparatus; and
a non-transitory computer readable storage medium in data communication with the data processing apparatus and storing instructions executable by the data processing apparatus and upon such execution cause the data processing apparatus to perform operations comprising:
identifying, by the one or more computing devices, logical relationships between panels for a user interface of the one or more computing devices;
obtaining, by the one or more computing devices, a set of interface patterns that correspond to different logical relationships between panels and describe different spatial relationships for arranging panels having the corresponding logical relationships;
determining, by the one or more computing devices, that at least one of the logical relationships between the panels for the user interface matches a logical relationship corresponding to a particular interface pattern;
in response to determining that at least one of the logical relationships between panels for the user interface matches the logical relationship corresponding to the particular interface pattern, selecting, by the one or more computing devices, the particular interface pattern from among the set of interface patterns to specify the arrangement of the panels of the user interface; and
providing, by the one or more computing devices, the user interface having the panels arranged in the user interface according to the particular interface pattern that is selected,
wherein determining that at least one of the logical relationships between the panels for the user interface matches a logical relationship corresponding to a particular interface pattern comprises:
determining a first relationship similarity score for the particular interface pattern based on a logical relationship corresponding to the particular interface pattern and the logical relationships between the panels for the user interface;
determining a second relationship similarity score for a second interface pattern based on a logical relationship corresponding to the second interface pattern and the logical relationships between the panels for the user interface; and
determining that the first relationship similarity score indicates a level of similarity between the logical relationship corresponding to the particular interface pattern and the logical relationships between panels for the user interface that is higher than a level of similarity that the second relationship similarity score indicates between the logical relationship corresponding to the second interface pattern and the logical relationships between the panels for the user interface; and
wherein determining that at least one of the logical relationships between the panels for the user interface matches the logical relationship corresponding to the particular interface pattern is based on determining that the first relationship similarity score indicates a level of similarity that is higher than the level of similarity indicated by the second similarity score.

14. The system of claim 13, wherein the logical relationship corresponding to the particular interface pattern comprises a relationship indicating that a first panel was created from a second panel.

15. The system of claim 13, wherein the panels for the user interface comprise:
a contextual menu of an application;
different windows of an application; or
different windows of different applications.

16. The system of claim 13, wherein identifying logical relationships between the panels for the user interface comprises one or more of:
identifying that a first panel is a child of a second panel;
identifying that a first panel is a sibling of a second panel;
identifying that a first panel is dependent on a second panel;
identifying that a first panel is embedded within a second panel;
identifying that a first panel is serial to a second panel; or
identifying that a first panel controls a second panel.

17. The system of claim 13, wherein identifying logical relationships between panels for the user interface comprises:
generating a graph of nodes, where each node represents a panel and edges between the nodes represent the logical relationships between the panels.

18. A computer-readable storage device encoded with a computer program, the program comprising instructions that when executed by one or more computers cause the one or more computers to perform operations comprising:
obtaining a set of interface patterns that correspond to different logical relationships between panels and describe different spatial relationships for arranging panels having the corresponding logical relationships;
determining that at least one of the logical relationships between the panels for the user interface matches a logical relationship corresponding to a particular interface pattern;
in response to determining that at least one of the logical relationships between panels for the user interface matches the logical relationship corresponding to the particular interface pattern, selecting the particular interface pattern from among the set of interface patterns to specify the arrangement of the panels of the user interface; and
providing the user interface having the panels arranged in the user interface according to the particular interface pattern that is selected, wherein determining that at least one of the logical relationships between the panels for the user interface matches a logical relationship corresponding to a particular interface pattern comprises:

determining a first relationship similarity score for the particular interface pattern based on a logical relationship corresponding to the particular interface pattern and the logical relationships between the panels for the user interface;

determining a second relationship similarity score for a second interface pattern based on a logical relationship corresponding to the second interface pattern and the logical relationships between the panels for the user interface; and determining that the first relationship similarity score indicates a level of similarity between the logical relationship corresponding to the particular interface pattern and the logical relationships between panels for the user interface that is higher than a level of similarity that the second relationship similarity score indicates between the logical relationship corresponding to the second interface pattern and the logical relationships between the panels for the user interface; and wherein determining that at least one of the logical relationships between the panels for the user interface matches the logical relationship corresponding to the particular interface pattern is based on determining that the first relationship similarity score indicates a level of similarity that is higher than the level of similarity indicated by the second similarity score.

* * * * *

UNITED STATES PATENT AND TRADEMARK OFFICE
CERTIFICATE OF CORRECTION

| | |
|---|---|
| PATENT NO. | : 10,628,109 B2 |
| APPLICATION NO. | : 15/673082 |
| DATED | : April 21, 2020 |
| INVENTOR(S) | : Murphy et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Twenty-fourth Day of November, 2020

Andrei Iancu
*Director of the United States Patent and Trademark Office*